United States Patent
Lee

(10) Patent No.: US 6,847,357 B2
(45) Date of Patent: Jan. 25, 2005

(54) REMOTE CONTROL DEVICE HAVING WHEEL AND BALL SWITCHES FOR CONTROLLING FUNCTIONS OF AN ELECTRONIC MACHINE

(75) Inventor: Chang Ryul Lee, Seoul (KR)

(73) Assignee: Hinics Co., Ltd., Seoul (KR)

( * ) Notice: Subject to any disclaimer, the term of this patent is extended or adjusted under 35 U.S.C. 154(b) by 266 days.

(21) Appl. No.: 09/931,407

(22) Filed: Aug. 17, 2001

(65) Prior Publication Data

US 2002/0093490 A1 Jul. 18, 2002

(30) Foreign Application Priority Data

Aug. 18, 2000 (KR) ........................................ 2000-47939
Jul. 27, 2001 (KR) ........................................ 2001-45566

(51) Int. Cl.$^7$ ................................................ G09C 5/00
(52) U.S. Cl. ...................................... 345/184; 345/169
(58) Field of Search ................................ 345/156, 158, 345/169, 168, 157, 173, 717, 721, 718, 184; 348/734; 725/37, 39, 40, 60, 61; 341/35

(56) References Cited

U.S. PATENT DOCUMENTS

| | | | |
|---|---|---|---|
| 5,589,893 A | * | 12/1996 | Gaughan et al. ............... 725/37 |
| 5,900,867 A | * | 5/1999 | Schindler et al. ............ 345/719 |
| 6,285,357 B1 | * | 9/2001 | Kushiro et al. .............. 345/169 |
| 6,480,188 B1 | * | 11/2002 | Horsley ....................... 345/184 |
| 6,543,052 B1 | * | 4/2003 | Ogasawara ................... 725/60 |
| 6,597,374 B1 | * | 7/2003 | Baker et al. ................. 345/717 |

* cited by examiner

Primary Examiner—Chanh Nguyen
(74) Attorney, Agent, or Firm—Birch, Stewart, Kolasch & Birch, LLP

(57) ABSTRACT

A remote control device includes a case; a display section situated at an upper section of the front face of the case; a machine section wheel switch section situated at inside of the case, some part of the section being exposed through the front face and containing a first wheel operation section, a first click encoder and a first push sensor; a menu function selection ball switch section which contains a second wheel operation section, a second click encoder and a second push sensor; a function selection ball switch section situated at inside of the case, some parts of the function selection ball switch section being exposed through the front face; a CPU which inputs, outputs and controls and electrical signals generated by rotation of said machine selection wheel switch section, menu selection wheel switch section and function selection ball switch section; a signal transmitting section being connected to an output of the CPU, and a memory having built-in machine, menu and function selection programs; and a click sound generation section having a speaker.

12 Claims, 10 Drawing Sheets

REMOTE CONTROL DEVICE HAVING WHEEL AND BALL SWITCHES FOR CONTROLLING FUNCTIONS OF AN ELECTRONIC MACHINE

BACKGROUND OF THE INVENTION

The present invention is related to a remote control device with displays and ball switches. More particularly, the invention relates to a remote control device with a plurality of functional switches which is capable of readily controlling all functions of an electronic machine using a wheel and ball switch from a remote location.

Also, the functions can be easily selected from a displayed menu system hence a separate learning process is not required.

Conventionally, a wireless remote control based on an Infrared light signal method was used in order to control an electronic machine remotely. Initially, these machines were confined to the type of machines such as TV, VCR and A/V, however, the application area is being enlarged comprising air conditioners and electric fans due to its proven convenience.

With the development of electronic technology, the number of functionality of various electronic machines has increased. As a result, the operation of remote control devices which control various electronic machines has become complicated and a significant time is required to understand the operation method. For the standard users, only the basic functions are being used and even for the skilled users the usage is limited due to their complexity.

"Directional key apparatus for a remote control device", Korean Pat. Nos. 1997-8594(1997.03.14) discloses a remote control device which comprises a various type of menus for setting the environment of electronic machines based on cursor control rather than only providing the functions for switching on/off power and changing of channels.

The disclosed remote control device comprises a key body, a cap which covers and opens the key body, an upper section guide which unites with the cap at the lower face, a lower guide which unites with the upper guide and an elastic member which is placed between the key body and the upper guide and elastically supports the key body upwards, and a hook which forms along an extended line from the lower face of the key body through to the plate in order to prevent the derailing of a directional key.

This type of remote control devices has problem of requiring some time for accurate operation, due to the loss of directionality concerning the movement in up/down, left/right, up/left, up/right, down/left and down/right direction during the operation process of the key body to move the cursor.

Also, one remote control device for complicated functions and another remote control device for simple functions for an electronic machine were sometimes used, however, there were still problems of frequent movement to other keys and repeated button pushing.

Due to the inconvenience of using separate remote control device for each of different machines, an integrated remote control device was proposed. Four different types of remote control devices were proposed namely, A, B, C and D. A type is an integrated remote control device mainly for A/V machines which has 2 to 6 different types and has many switches. B type is also an integrated remote control device for all types of electronic machines and has many switches. C type is a small or card type integrated remote control device for A/V machines which has 2 to 6 different types and contains only the frequently used switches. D type is an integrated remote control device for all types of electronic machines which has a display device and a touch screen where it displays the corresponding switch configuration according to each of the machines and a selection can be made through the finger.

For the individual push switch type such as A, B, and C, the previously mentioned problems can not be solved. For D type, the problems with the number of switches and their functions can be resolved, however, the inconvenience of repeatedly pushing the buttons and not being able to feel the process of pushing the switch have been appeared as other problems.

In order to overcome the above problems of prior art, Korean Pat. Nos. 2000-47939(2000.08.18) issued to the same applicant of the present invention discloses a "Remote control device with displays and ball switches".

The function selection ball switch which forms a part of the disclosed remote control device comprises a rotational axis which has a plurality of wheels at the both ends in order to restrict the moving direction of the ball, a plurality of fixture which support the rotational axis and a ball guide whose lower end is inserted to an inserting groove. The disclosed remote control device is practical easy to use, however, due to the increase in the number of parts, it has a higher manufacturing cost and the manufacturing time was longer.

SUMMARY OF THE INVENTION

The present invention is designed to overcome the above problems of prior art. The object of the invention is to provide a remote control device with displays and ball switches which enables a speedy control of all functions of an electronic machine possible through a wheel and ball switch by reducing the movement of fingers and can conveniently be used without a separate learning process by providing a displayed menu system where a selection can be made by a click.

In order to achieve the above objectives, the present invention comprises: a case; a display section situated at upper section of the front face of the case; a machine selection wheel switch section which is situated at inside of the case and some parts of the section are exposed through the front face and contains a first wheel operation section, a first click encoder and a first push sensor; a menu function selection ball switch section which contains a second wheel operation section, a second click encoder and a second push sensor; a function selection ball switch section which is situated at inside of the case and some parts of the section are exposed through the front face; a CPU which inputs, outputs and controls the electric signals generated by rotation of said machine selection wheel switch section, menu selection wheel switch section and function selection ball switch section; a signal transmitting section in connection with output and a memory which has built in machine, menu and function selection program; and a click sound generation section with a speaker.

Figure 1:
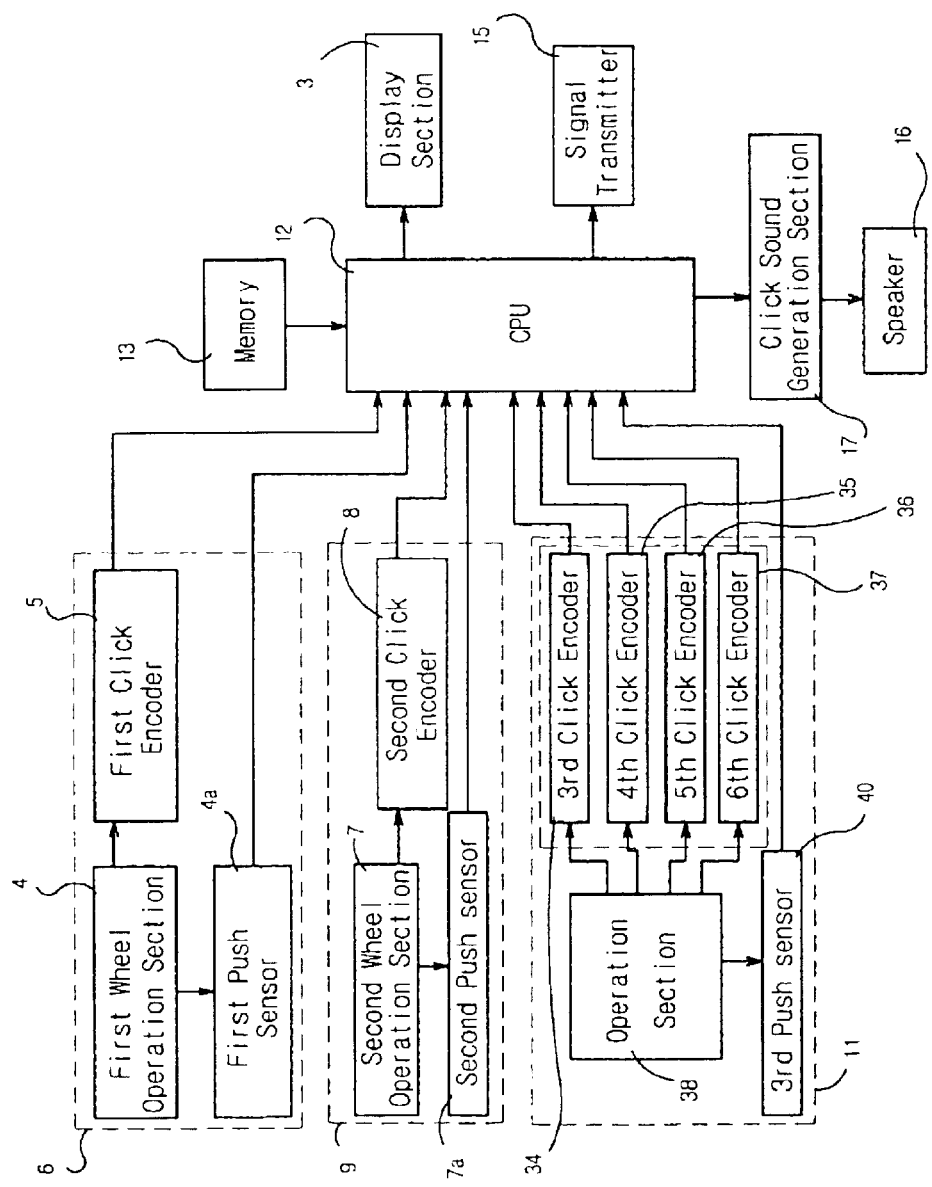
FIG. 1 illustrates a remote control device according to the present invention.

[Description of the Numeric on the Main Parts of the Drawings]

2: Case
3: Display Section
4: A First Wheel Operation Section
5: A First Click Encoder
6: Machine Selection Wheel Switch Section
7: A Second Wheel Operation Section
8: A Second Click Encoder
9: Menu Selection Wheel Switch Section
11: Function Selection Ball Switch Section
12: CPU
13: Memory
15: Signal Transmitter
16: Speaker
17: Click Sound Generation Section

DETAILED DESCRIPTION OF THE EMBODIMENTS

Hereinafter, preferred embodiments of the present invention will be described in detail with reference to the accompanying drawings.

As shown in FIG. 1 to FIG. 7, a remote control device 1 according to the present invention comprises a case which has an inner space, a display section 3 situated at upper section of the front face which displays the present status in the machine selection, menu selection and function selection, a machine selection wheel switch section 6 which has a first wheel operation section 4, a first click encoder 5 and a first push sensor 4a and a menu selection wheel switch section 9 which has a second wheel operation section 7, a second click encoder 8 and a second push sensor 7a are located inside of the case 2 at lower section of the display section 3 while at the same time some parts are exposed at the front face of the case 2.

Also, an opening section 10 with a specific radius is located at the midway between the machine selection wheel switch section 6 and the menu selection wheel switch section 9, towards the lower end of the case 2. A partially exposed function selection ball switch section 11 is located in the opening section 10.

The present invention further comprises a CPU which inputs, outputs and controls the electric signals which are generated by the operation of the machine selection wheel switch section 6, the menu selection wheel switch section 9 and the function selection ball switch section 11 and a memory 13 which has built in machine, menu and function selection program; and a click sound generation section 17 which has a speaker and a signal transmitting section 15.

Preferably the case 2 is separated into an upper and lower section case and although not shown, some batteries are placed inside the case to provide a power source.

Figure 5:
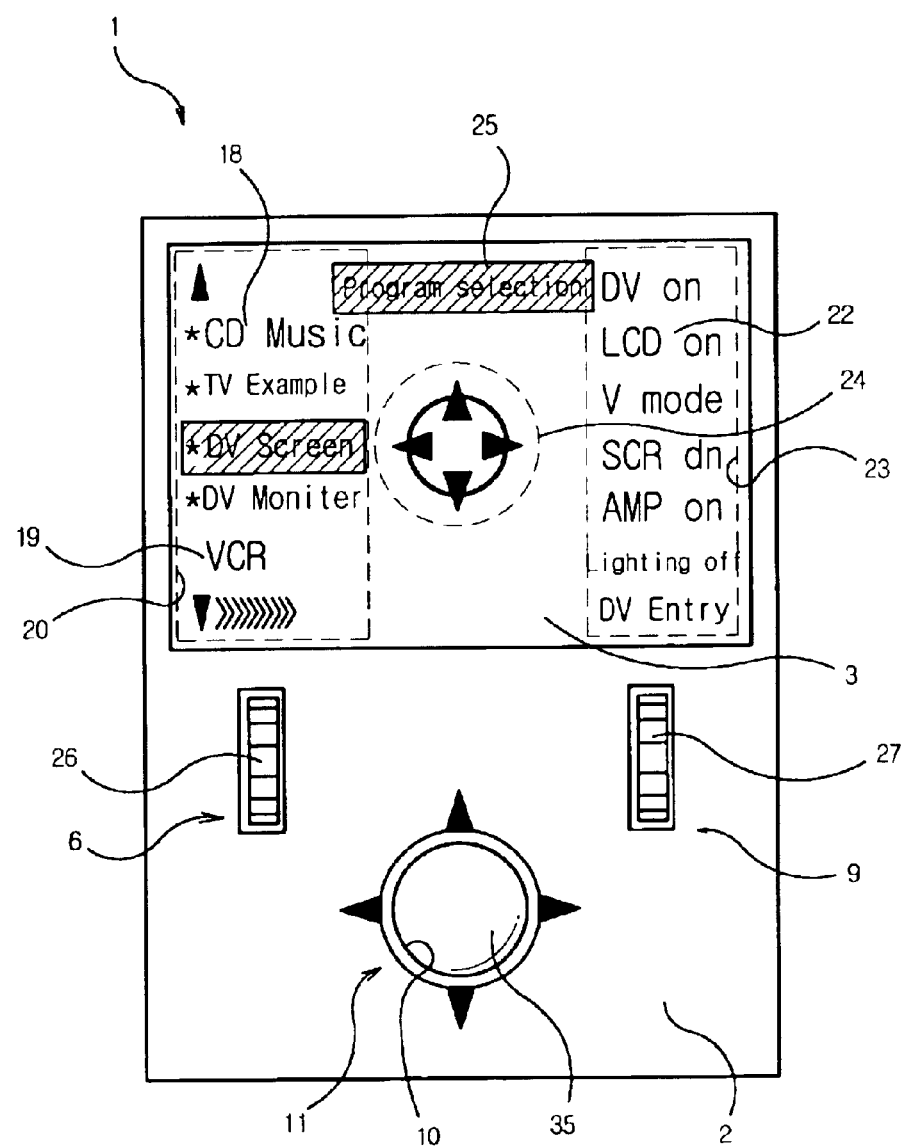
FIG. 5 is a front view of the machine selection mode from the remote control device according to the present invention.
Figure 6:
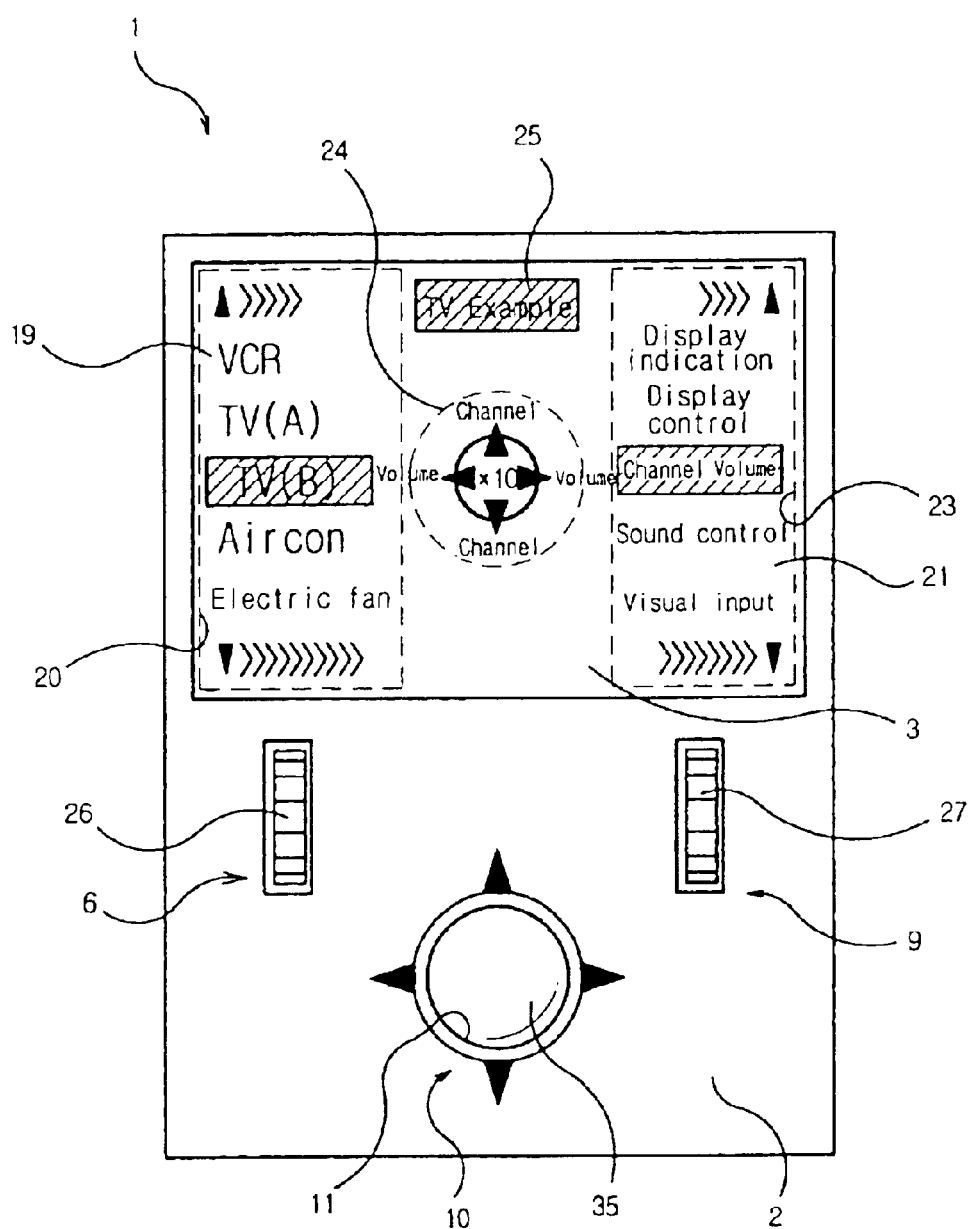
FIG. 6 is a front view of the menu selection mode from the remote control device according to the present invention.
Figure 7:
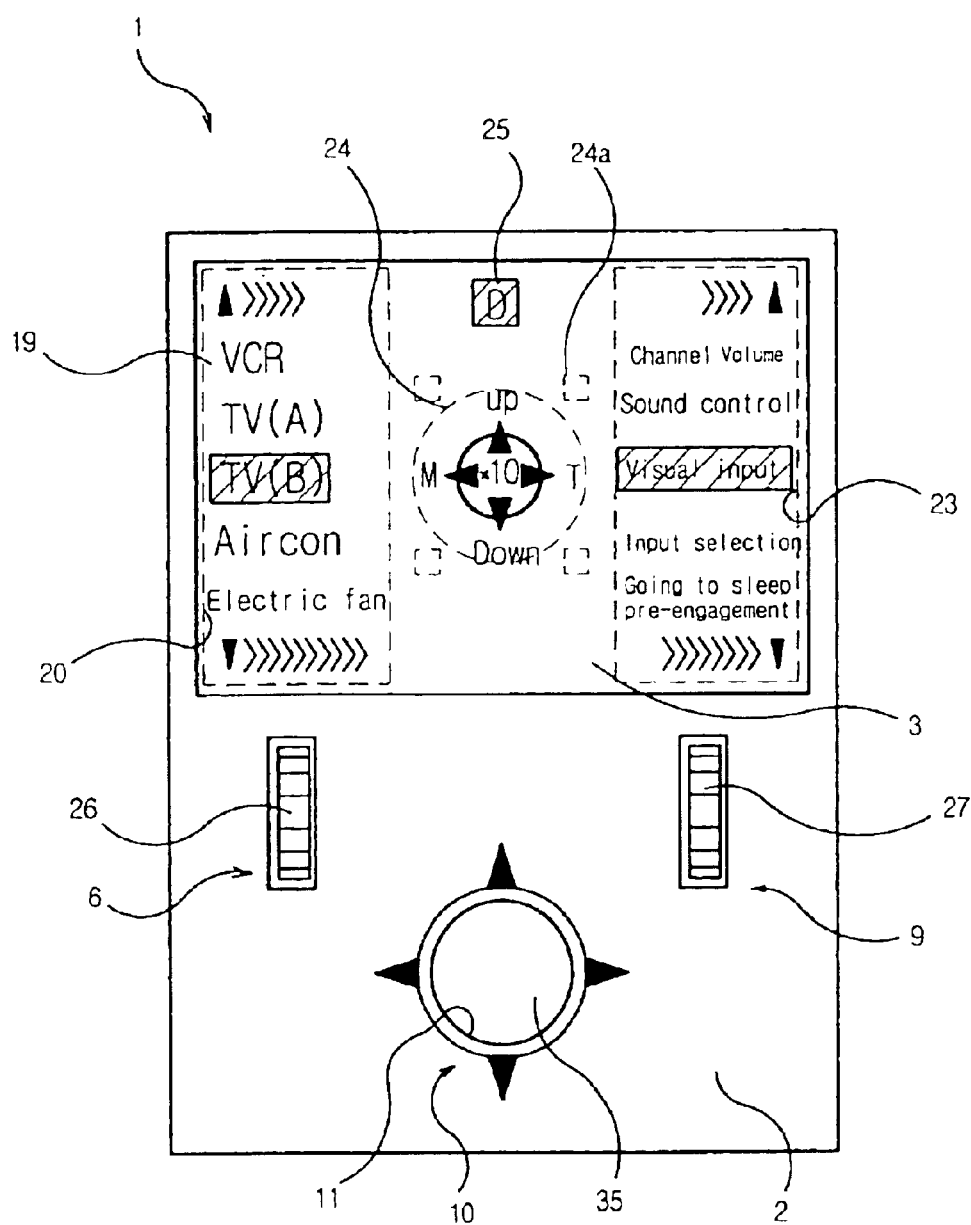
FIG. 7 is a front view of the function selection mode from the remote control device according to the present invention.
Figure 8:
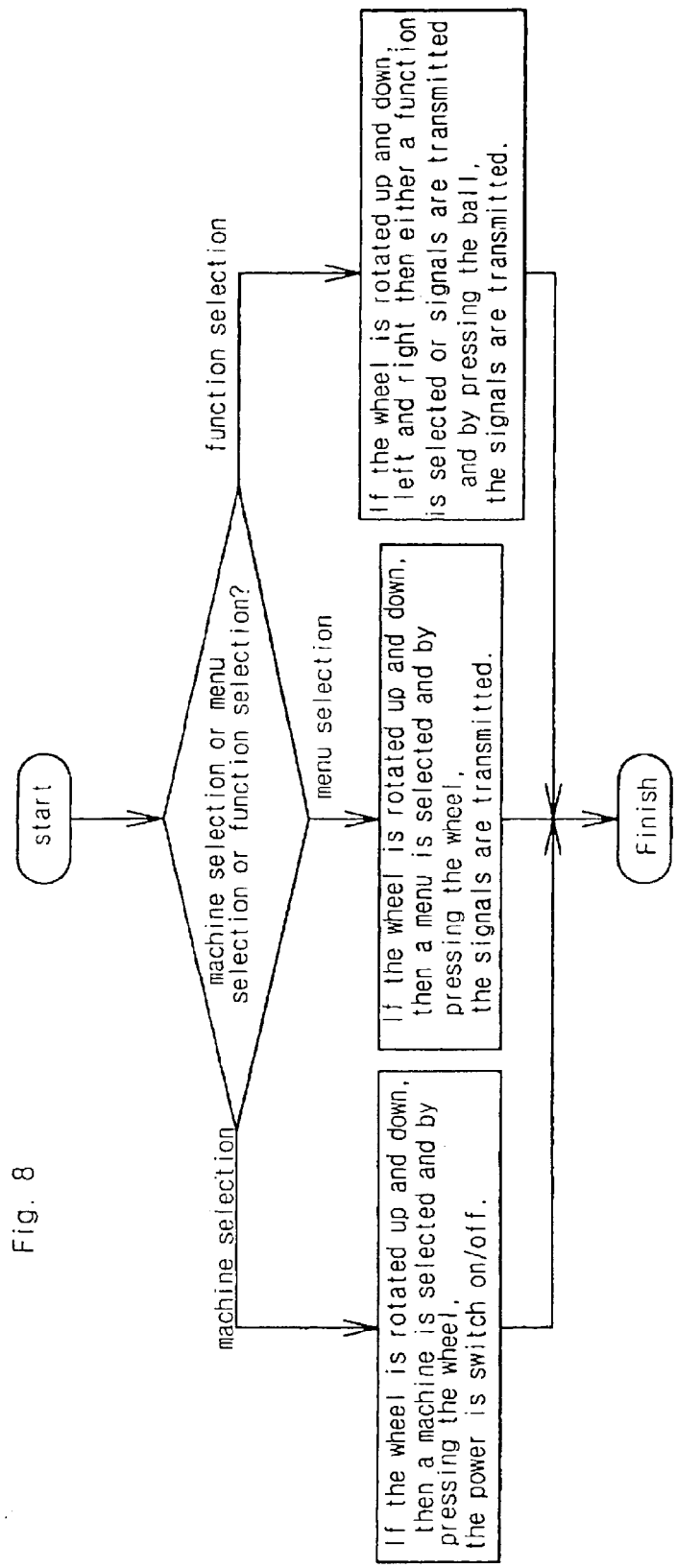
FIG. 8 is a flow chart which illustrate an overall operation process using the remote control device according to the present invention.
Figure 9:
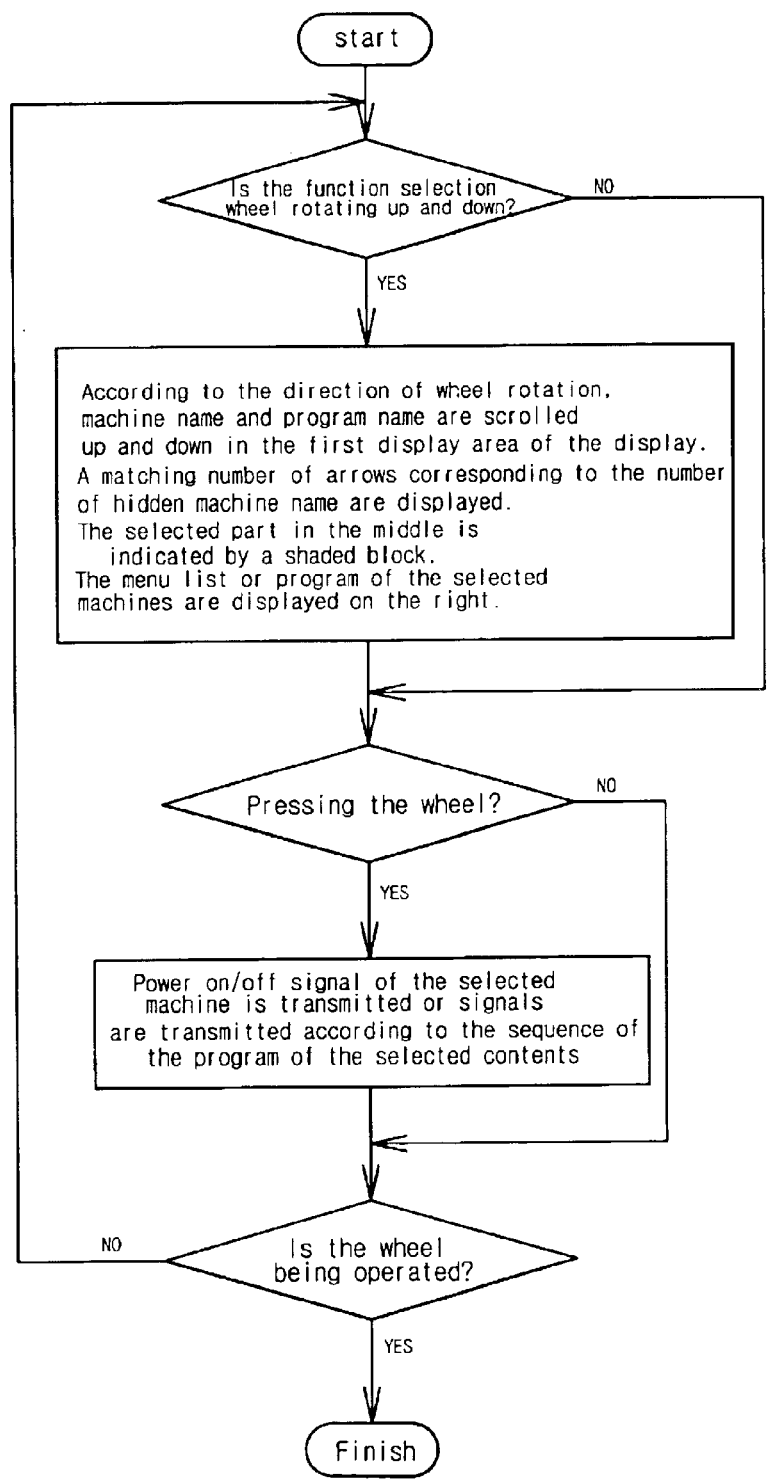
FIG. 9 is a flow chart which illustrate a machine selection process using the remote control device according to the present invention.
Figure 10:
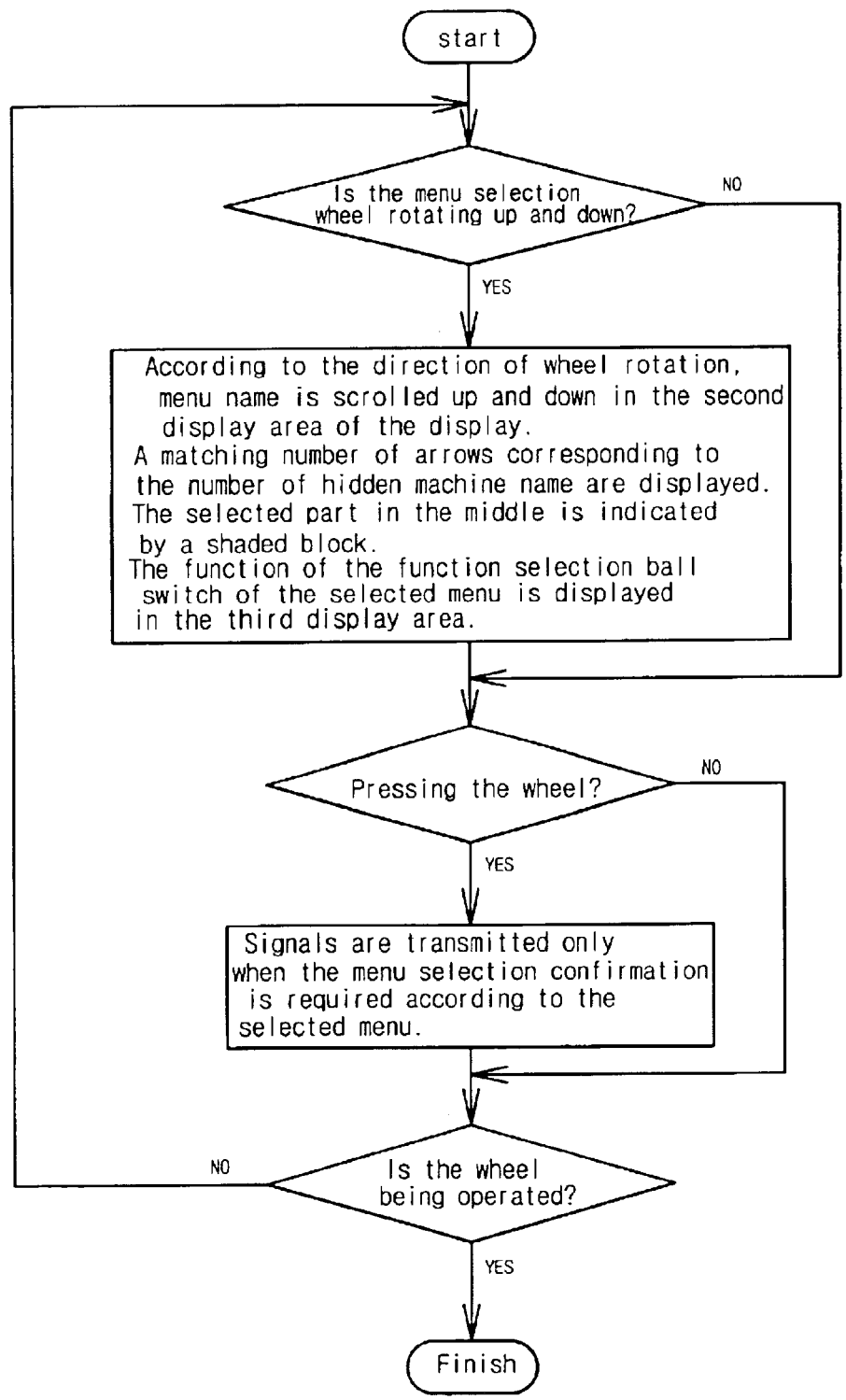
FIG. 10 is a flow chart which illustrate a menu selection process of the remote control device according to the present invention.
Figure 11:
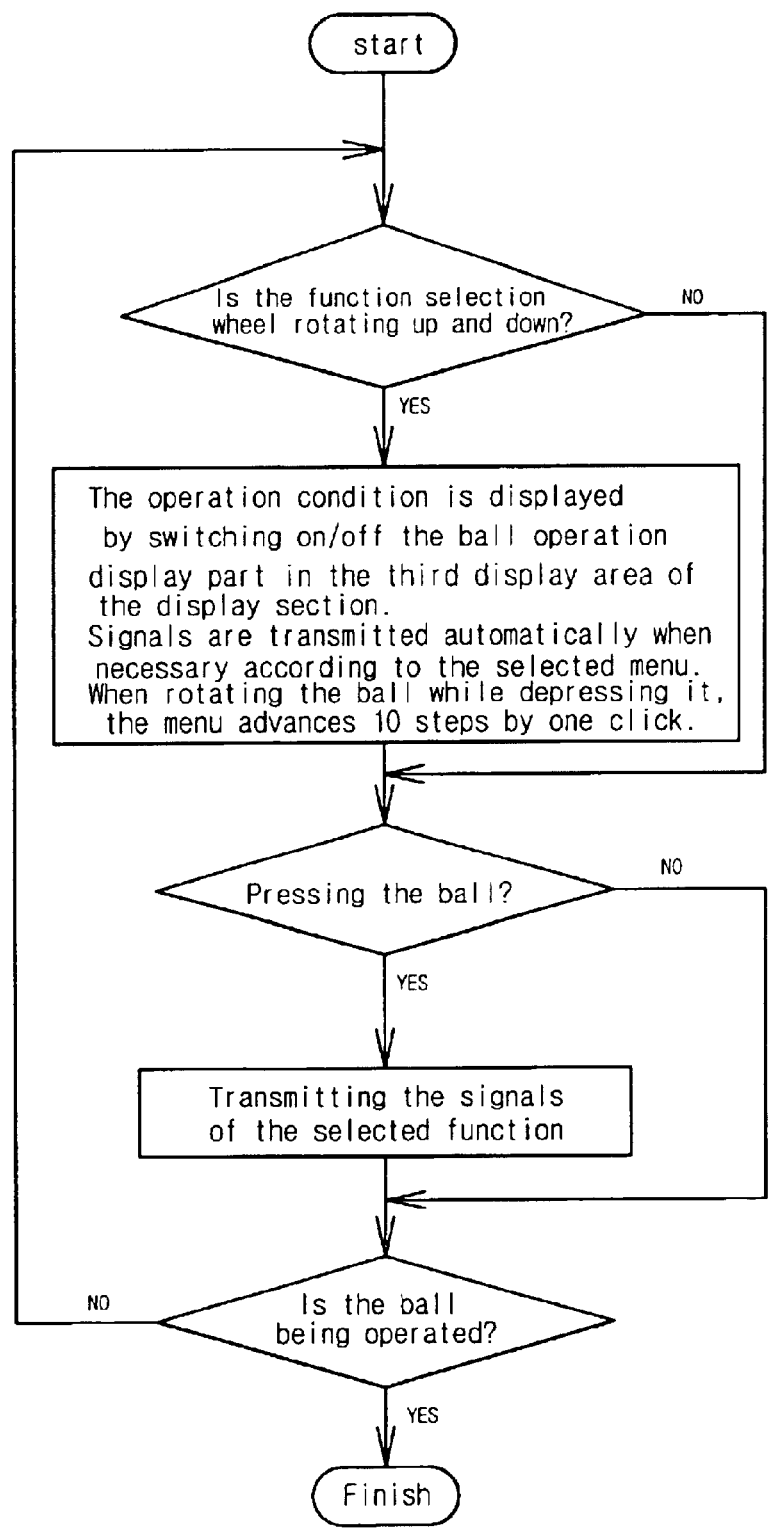
FIG. 11 is a flow chart which illustrate a function selection process of the remote control device according to the present invention.

As shown in FIG. 5 to FIG. 7, the display section 3 comprises a first display area 20 which displays program name 18 and machine name 19, a second display area 23 which displays a program list 21 and a menu 22, a third display area 24 which displays the function of a function selection ball switch section 11 and a fourth display area 25 which displays the condition of the operating remote control device.

The machine name 18 and program name 19 in the first display area 20 can be scrolled up/down according to the rotation direction of the machine selection wheel switch section 6. The selected part in the middle is indicated by a shaded block.

Also, a matching number of arrows corresponding to the number of hidden machine name 19 and program name 18 are displayed at the top and bottom end of the display area in order to indicate to the user. In connection with this, the menu list of selected machines and programs are displayed in the second display area 23. In front of a selected program name 18, a start is displayed in order to be able to distinguish the machine name 19.

In the second display area 23, the menu name can be scrolled up/down according to the rotation direction of the menu selection wheel switch section 9. The selected part in the middle is indicated by a shaded block. Similarly to the first display area 20, a matching number of arrows corresponding to the number of hidden menu name is displayed at the top and bottom end of the second display area 23. The function of the function selection ball switch section 11 with respect to the selected menu indicated by a shaded block can also be display in third display area 24 at the same time.

The third display area 24 is switch on/off according to the rotation direction of the function selection ball switch section 9. By rotating the ball while depressing it, the menu advances 10 steps by one click.

Also, at the both ends of the third display area 24, an arrow indicating outwards is displayed in order to show that year and minutes are not being displayed (page 9, line 11).

The machine selection wheel switch section 6 and the function selection ball switch section 9 can perform the roles of up, down, rotation and push switches at one specific point and is almost identical to a wheel mouse.

The wheels 26, 27 of the machine and the function selection ball switch section 6, 9 are pushed towards the upper section or lower section, the first and second operation sections 4, 7 which are connected also rotates. The rotated amount is detected by the first and second click encoders 5, 8 and the detected electric signal is applied to CPU 12. More specifically, through the detected value of the first and second click encoders 5, 8, the program name, machine name, program list or menu display are scrolled to the shaded block by CPU 12.

In this instance, if the wheel is pressed the electric signals of the first and second push sensors 4a, 7a are applied to CPU 12. As a result, CPU 12 reads the control codes and transmits signals through the signal transmitting section 15 in order to operate the machines.

Figure 2:
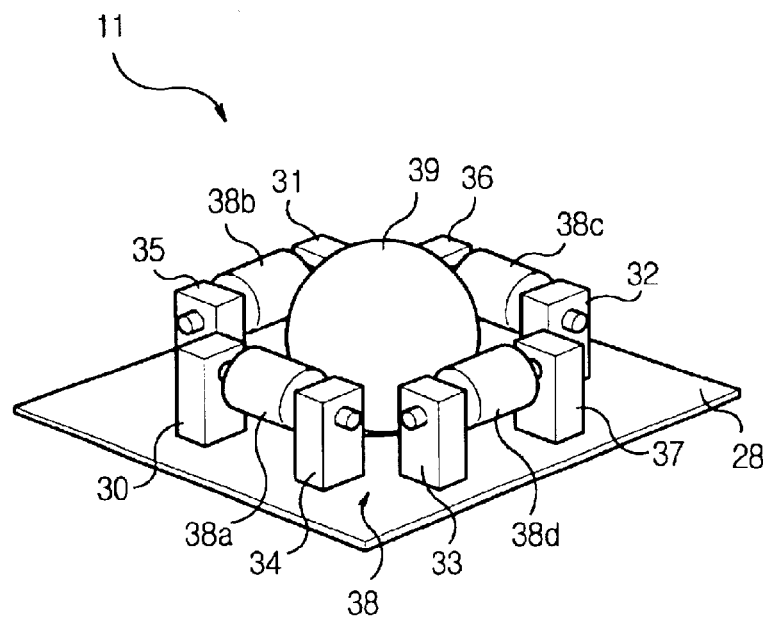
FIG. 2 is a perspective view of the function selection ball switch section of the remote control device according to the present invention.
Figure 3:
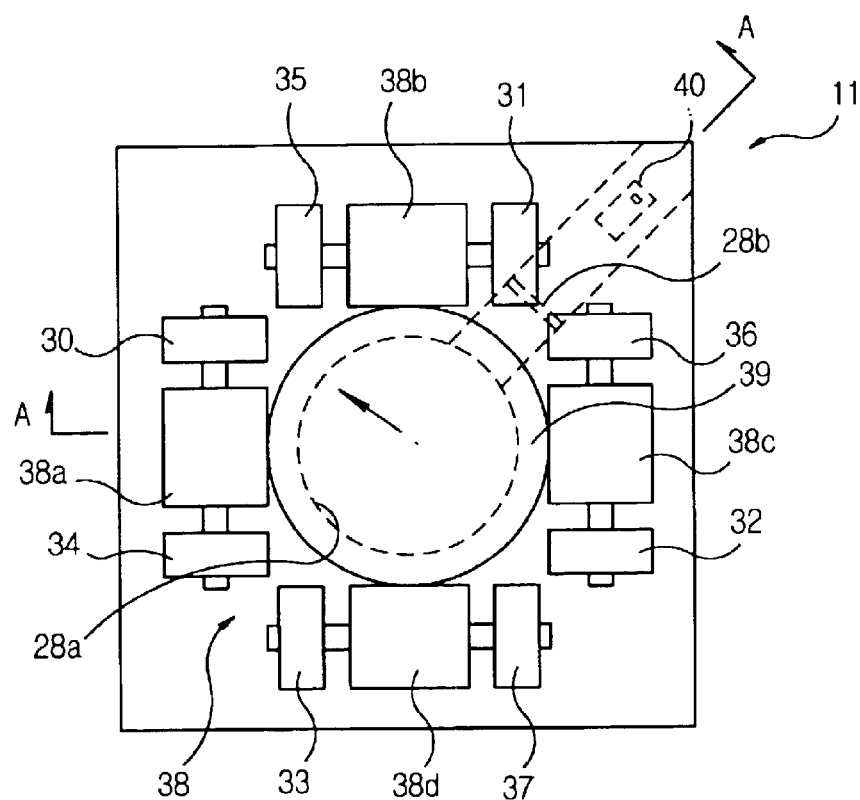
FIG. 3 is a top view of the function selection ball switch section according to the present invention.
Figure 4:
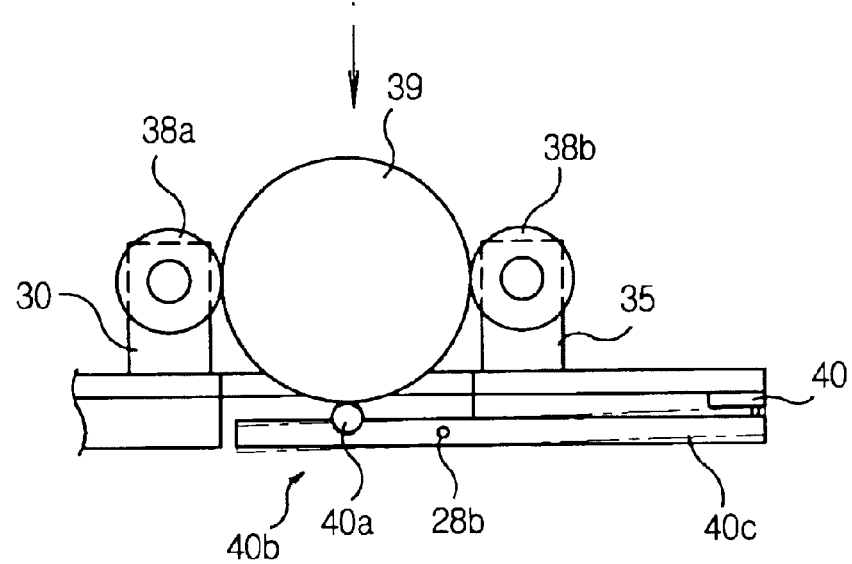
FIG. 4 is a cross section A—A view of FIG. 3.

As shown in FIG. 2 to FIG. 4, the function selection ball switch section 11 comprises a PCB 28, first to fourth fixtures 30–33 located diagonally on the upper face of PCB 28, third to sixth click encoders 34–37 facing said first to fourth fixtures 30–33, an operation section 38 located between said first to fourth fixtures 30–33 and third to sixth click encoders 34–37 and further comprises a plurality of rotational axis 38a–38d, a ball 39 situated on a through-hole 28a while in contact with the outer periphery of said rotational axis 38a–38d, a third push sensor 40 located the bottom face of PCB 28 which is switched on/off by a support plate 40c that further comprises a stopper 40b with a support ball 40a which supports said ball 39.

The through-hole 28a is formed in the middle of PCB 28 and at one side of the through-hole 28a forms a hinge section 28b as a single unit.

The click sound generation section 17 produces a click sound by the third to sixth click encoders 34–37 and simultaneously, according to the variation of detected electric signals produces a unique sound stored in the memory 12 through the control of CPU 12.

For example, the selection of unique sound according to the directions should be symbolically related to the direction of switch operation so that an upwards direction is a short high pitch note, a downwards direction is a short low pitch note, a left direction is a short high to low flow pitch, a right direction is a short low to high flow pitch and a pushing down direction is a long medium pitch.

Also, as shown in FIG. 7, the ball 39 of the ball switch section 11 is rotated one click towards the left and again rotated one click upwards, then selection areas in a total of 8 directions can be operated which includes four+type direction such as month, hour, upwards and downwards and x type diagonal directions such as a square display section.

As shown in FIG. 5, the remote control device is constructed as above when the machine selection wheel switch section 6 is rotated in the up or down directions, the program name 18 of the first display area 20 and the machine name 19 is scrolled up or down and at the same time and a shaded block is selected at the middle as well as showing the matching number of arrows corresponding to the hidden number of name at the top and bottom end of the display area.

In this instance, when the selected contents are programs, a list of the programs is displayed in the second display area 23 and when the selected contents are machines, the menu of the machines are displayed. At the same time, the program selection or machine selection are displayed in the first display area 20 therefore the contents of the work in progress can more clearly be understood.

When the machine selection wheel switch section 6 is pressed, electric signals applied to CPU 12 by the first push sensor. If the content corresponding to the electric signals is a machine name 19, then the machine is switched on and if the content corresponding to the electric signals is a program name 18, then the machines are switched on according to the sequence of the list contents by transmitting the control signals through the signal transmitting section 15. Also, the machine name is moved to a shaded block in the first display area 20 in order to operate the next sequence.

As shown in FIG. 6, if the wheel of the menu selection wheel switch section 9 is rotated up and down, the menu type in the second display area 23 is scrolled up and down and the shaded blocks are being selected.

In this instance, a matching number of arrows corresponding to the number of hidden menu and at the time of first machine selection, the most frequently used menu is displayed in the shaded block.

According to the selected contents, the function of operational direction of the function selection ball switch section 11 is displayed in separate locations in the third display area 24. If there is a need to select according to the menu contents, then by pressing the menu selection wheel switch section 9, electric signals are applied to CPU 12 by the second pushing sensor 7a and in turn CPU 12 transmits the signals via the signal transmitting section 15 in order to control the machine.

As shown in FIG. 7, when the function selection ball switch section 11 is rotated up and down, left and right, electric signals corresponding to the contents displayed in the direction of the third display area 24 are transmitted. If the left and right direction is an auxiliary menu, then the type of the auxiliary menu is scrolled in the left and right directions and a matching number of arrows corresponding to the number of hidden auxiliary menu.

In the fourth display area 25, the contents of the work which the function selection ball switch section 11 is capable of performing is displayed and the list of things that can be performed by pressing and rotating the function selection ball switch 11 in direction display icon of the function selection ball switch section 11.

If there is a need to select according to the function contents, then by pressing the function selection wheel switch section 11, electric signals are applied to CPU 12 by the third pushing sensor 40 and in turn CPU 12 transmits the signals via the signal transmitting section 15 in order to control the machine.

In this instance, the operation condition of the function selection ball switch section 11, if the ball 39 is pushed towards the direction as shown in FIG. 3, then the load applied to a third and fourth click encoder 34, 35, which supports rotational axis 38a, 38c that is in contact with the ball 39, is increased and subsequently rotation is restricted.

In this condition, the pushing direction of the ball 39 is changed to an upward direction, the rotation direction of ball 39 is restricted to a horizontal direction by the rotational axis 38a, 38c and subsequently rotation in the up and down directions are restricted.

More specifically, even if a user applies a force to the ball 39 in a slanted direction, the rotational axis 38a, 38b, 38c, 38d operate in specific ways in which an exact operation possible.

Also, electric signals are applied to CPU 12 by the fourth click encoder 35 located at the end of the rotational axis 38b during the rotation of the ball 39.

By applying signals to CPU 12 by the fourth click encoder 35, CPU 12 recognizes that the ball 39 is moving upwards by comparing with the control codes and as previously mentioned, transmits signals through the signal transmitting section 15 in order to operate the machines.

Also, the unique sound from the memory 13, selected by CPU 12 as a result of electric signals from the fourth click encoder 35 can be sounded through the speaker of the click sound generation section 17.

Electric signals are applied to CPU 12 by the third push sensor 40 at the same when the ball 39 is pressed from top to bottom, hence, as mentioned previously, signals are transmitted through the signal transmitting section 15 in order to operate the machines.

Also, when a finger pressing the ball 39 is removed, the ball 39 returns to the center up position due to the elastic force of the third push sensor 40.

In the present invention, the function selection ball switch is used in a remote control device, however, it is apparent that it can be used in monitor picture control, car audio control, volume, timer, and color control for tv, home automations.

What is claimed is:

1. A remote control device with displays and ball switches, comprising:
   a case;
   a machine selection wheel switch section situated inside of said case, some parts of the machine selection wheel switch section being exposed through the front face of said case and containing a first wheel operation section, a first click encoder and a first push sensor;
   a menu selection wheel switch section which contains a second wheel operation section, a second click encoder and a second push sensor;
   a function selection ball switch section situated inside of said case, some parts of the function selection ball switch section being exposed through the front face of said case;
   a CPU which inputs, outputs and controls electrical signals generated by rotation of said machine selection wheel switch section, menu selection wheel switch section and function selection ball switch section;
   a signal transmitting section being connected to an output of the CPU, and a memory having built-in machine, menu and function selection programs;
   a click sound generation section having a speaker; and
   a display section situated at an upper section of said case, the display section displaying information that is responsive to the rotation of the machine selection wheel switch section, the menu selection wheel section and the function section ball switch section.

2. The remote control device as claimed in claim 1, wherein the first and second wheel operation sections rotate when wheels of the machine selection wheel switch section and the menu selection wheel switch section are pressed, and a value of the rotation of the first and second wheel operation sections is detected by the first and second click encoders to scroll to a program name, a machine name, a program list or a menu display in the display section.

3. The remote control device as claimed in claim 2, wherein the program name or the machine name are scrolled up or down when the wheel of the machine selection wheel switch section is rotated in up or down directions, respectively.

4. The remote control device as claimed in claim 3, wherein contents of work which the function selection ball switch section is capable of performing are displayed in the display section.

5. The remote control device as claimed in claim 2, wherein the program list or the menu display are scrolled up or down when the wheel of the menu selection wheel switch section is rotated in up or down directions, respectively.

6. The remote control device as claimed in claim 1, wherein the click sound generation section produces a click sound by a plurality of click encoders, wherein different sounds are produced based on a direction of operation of the function selection ball switch section.

7. A remote control device with displays and ball switches, comprising:
   a case;
   a display section situated at upper section of the front face of said case;
   a machine selection wheel switch section situated inside of said case, some parts of the machine selection wheel switch section being exposed through the front face of said case and containing a first wheel operation section, a first click encoder and a first push sensor;
   a menu selection wheel switch section which contains a second wheel operation section, a second click encoder and a second push sensor;
   a function selection ball switch section situated inside of said case, some parts of the function selection ball switch section being exposed through the front face of said case,
   wherein said function selection ball switch section further comprises:
      a PCB having a though-hole and a hinge section at one side;
      first to fourth fixtures located diagonally on an upper face of the PCB;
      third to sixth click encoders facing said first to fourth fixtures;
      an operation section located between said first to fourth fixtures and said third to sixth click encoders and further comprising a plurality of rotational axes;
      a ball situated on the through-hole and being in contact with an outer periphery of said rotational axes;
      a third push sensor located on a bottom face of the PCB and being switched on/off by a support plate that further comprises a stopper with a support ball which supports said ball;
   a CPU which inputs, outputs and controls electrical signals generated by rotation of said machine selection wheel switch section, menu selection wheel switch section and function selection ball switch section;
   a signal transmitting section being connected to an output of the CPU, and a memory having built-in machine, menu and function selection programs; and
   a click sound generation section having a speaker.

8. A remote control device with displays and ball switches, comprising:
   a case;
   a display section situated at upper section of the front face of said case;
   a machine selection wheel switch section situated inside of said case, some parts of the machine selection wheel switch section being exposed through the front face of said case and containing a first wheel operation section, a first click encoder and a first push sensor;
   a menu selection wheel switch section which contains a second wheel
   operation section, a second click encoder and a second push sensor; a function selection ball switch section situated inside of said case, some parts of the function selection ball switch section being exposed through the front face of said case, wherein said display section further comprises:
      a first display area which displays a program name and a machine name;
      a second display area which displays a program list and a menu;
      a third display area which displays a function of said function selection ball switch section; and
      a fourth display area which displays a condition of the operating remote control device;

a CPU which inputs, outputs and controls electrical signals generated by rotation of said machine selection wheel switch section, menu selection wheel switch section and function selection ball switch section;

a signal transmitting section being connected to an output of the CPU, and a memory having built-in machine, menu and function selection programs; and a click sound generation section having a speaker.

9. The remote control device as claimed in claim 8, wherein said machine name and program name in said first display area can be scrolled up/down according to the rotation direction of said machine selection wheel switch section, a matching number of arrows corresponding to the number of hidden machine name and program name is displayed at the top and bottom end of the display, the selected part in the middle is indicated by a shaded block and the menu list of selected machines and programs are displayed in the second display area.

10. The remote control device as claimed in claim 8, wherein the menu name in said second display area can be scrolled up/down according to the rotation direction of the menu selection wheel switch section, a matching number of arrows corresponding to the number of hidden menu name is displayed at the top and bottom end of the display, the function of the function selection ball switch section with respect to the selected menu is displayed in third display area at the same time.

11. The remote control device as claimed in claim 8, wherein in connection with said first display area, either a menu or a program of the selected machine is displayed in the second display area.

12. The remote control device as claimed in claim 8, wherein in connection with said second display area, the function of said function selection ball switch section of the selected menu is displayed in the third display area.

* * * * *